(12) United States Patent
Woo (10) Patent No.: US 11,151,563 B2
(45) Date of Patent: Oct. 19, 2021

(54) AUTOMATIC PAYMENT DETERMINATION

(71) Applicant: PayPal, Inc., San Jose, CA (US)

(72) Inventor: Titus Woo, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 782 days.

(21) Appl. No.: 15/636,145

(22) Filed: Jun. 28, 2017

(65) Prior Publication Data

US 2019/0005500 A1 Jan. 3, 2019

(51) Int. Cl.
| | |
|---|---|
| G06Q 20/40 | (2012.01) |
| G10L 17/22 | (2013.01) |
| G10L 15/18 | (2013.01) |
| G10L 17/06 | (2013.01) |
| G06Q 20/32 | (2012.01) |
| G06Q 20/22 | (2012.01) |
| G06Q 20/12 | (2012.01) |
| G06Q 20/10 | (2012.01) |
| G06Q 20/14 | (2012.01) |
| G06Q 30/04 | (2012.01) |
| G06Q 50/00 | (2012.01) |
| G10L 17/00 | (2013.01) |

(52) U.S. Cl.
CPC ....... *G06Q 20/4014* (2013.01); *G06Q 20/102* (2013.01); *G06Q 20/123* (2013.01); *G06Q 20/145* (2013.01); *G06Q 20/29* (2013.01); *G06Q 20/3224* (2013.01); *G10L 15/18* (2013.01); *G10L 17/06* (2013.01); *G10L 17/22* (2013.01); *G06Q 30/04* (2013.01); *G06Q 50/01* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 8,700,526 B1* | 4/2014 | Cozens | G06Q 20/223 705/39 |
| 2016/0117651 A1* | 4/2016 | Davis | G06Q 20/386 705/40 |
| 2017/0064015 A1* | 3/2017 | Davis | H04W 4/021 |
| 2018/0160223 A1* | 6/2018 | Jones | G06Q 50/28 |

OTHER PUBLICATIONS

Zamora, Willian et al. "Accurate Ambient Noise Assessment Using Smartphones." Sensors (Basel, Switzerland) vol. 17,4 917. Apr. 21, 2017, doi: 10.3390/s17040917 (Year: 2017).*

\* cited by examiner

*Primary Examiner* — Kito R Robinson
*Assistant Examiner* — Shacole C Tibljas
(74) *Attorney, Agent, or Firm* — Haynes and Boone, LLP (57) ABSTRACT

A computer system monitors one or more communication applications on a device of a user. The computer system identifies a communication that corresponds to a payment from a plurality of communications on the one or more communication applications. In response to the identifying the communication that corresponds to the payment, the computer system automatically identifying one or more other users associated with the payment without prompting the user for information.

19 Claims, 5 Drawing Sheets

AUTOMATIC PAYMENT DETERMINATION

TECHNICAL FIELD

The present disclosure relates generally to digital payments, and more particularly to automatic digital payment determination.

BACKGROUND

In today's age, digital payments have become a major way that people conduct transactions with their peers and with other businesses. Oftentimes, when meeting up with friends, a check may be covered by a single person with the promise of being reimbursed. In some cases, the person may be paid back by his friends, however, in some cases, people forget to provide payment for the activity. Therefore, there is a need for an automated process for providing or receiving a digital payment to/from another party.

DETAILED DESCRIPTION

Embodiments of the present disclosure provide a system, method, and program product. A computer system monitors one or more communication applications on a device of a user. The computer system identifies a communication that corresponds to a payment from a plurality of communications on the one or more communication applications. In response to the identifying the communication that corresponds to the payment, the computer system automatically identifying one or more other users associated with the payment without prompting the user for information.

In the example embodiment, the present disclosure describes a solution to the problem of automatically identifying additional users who are involved in a transaction corresponding to a user. In the example embodiment, the present disclosure describes a solution that involves monitoring an application on a user device and identifying payment related activity. The solution then determines the parties involved in the payment (other users) and causes a display of a notification corresponding to a payment to the user for the purposes of user approval. If the user approves the payment, an invoice is transmitted to the other users associated with the payment or a payment from the user to the one or more of the other users is automatically processed.

In addition, in the example embodiment, the present disclosure describes a solution to, upon detecting payment related activity in an application on a user device, determine whether a detected payment is out of the norm for the user, and based on determining that the payment is not out of the norm for the user, determine other users involved in the payment. Furthermore, the solution describes transmitting an approval request to the user, and based on receiving approval from the user, transmitting an invoice (or multiple invoices) to the other users.

Embodiments of the present disclosure will now be described in detail with reference to the accompanying Figures.

Figure 1:
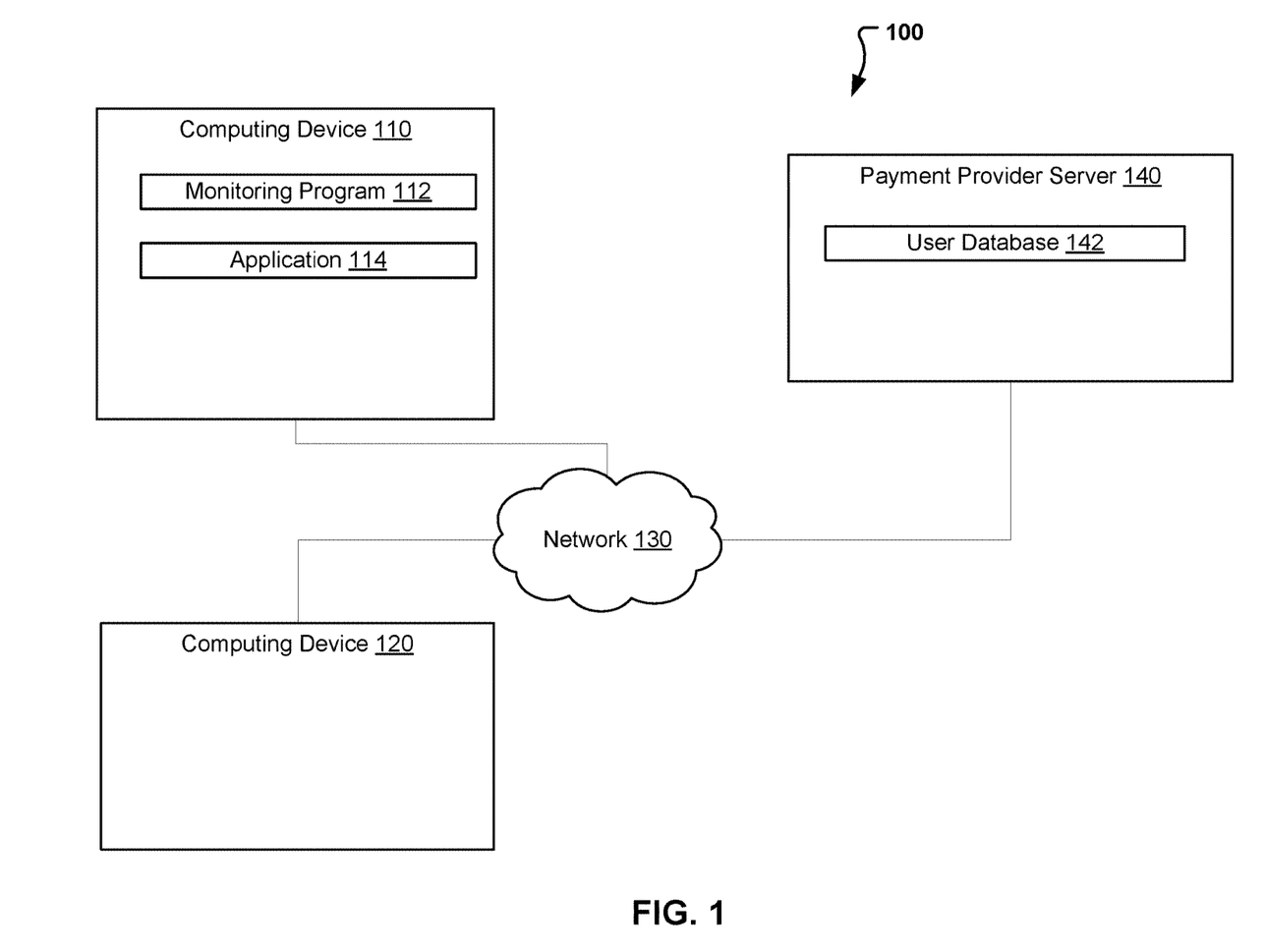
FIG. 1 illustrates a monitoring system, in accordance with an embodiment.

FIG. 1 illustrates monitoring system 100, in accordance with an embodiment. In an example embodiment, monitoring system 100 includes computing device 110, computing device 120, and payment provider server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110, payment provider server 140, and computing device 120.

In the example embodiment, computing device 120 is a mobile device such as a smartphone, however in other embodiments, computing device 120 may be a desktop computer, a laptop computer, a tablet computer, a handheld device, a thin client, or any other electronic device or computing system capable of receiving and sending data to and from other computing devices, such as computing device 110, via network 130. Computing device 120 is described in more detail with reference to FIG. 6.

Payment provider server 140 includes user database 142. In the example embodiment, payment provider server 140 may be a desktop computer, a laptop computer, a tablet computer, a mobile device, a handheld device, a thin client, or any other electronic device or computing system capable of receiving and sending data to and from other computing devices, such as computing device 110, via network 130. In the example embodiment, payment provider server 140 is a server that supports a mobile payment application, however, in other embodiments; payment provider server 140 may be a server that supports a payment website or a program. Payment provider server 140 is described in more detail with reference to FIG. 6.

User Database 142 includes information corresponding to one or more users. In the example embodiment, user database 142 includes information that describes payment details, social media information (such as user names, etc), voice sound profiles, transaction history, and personal information (such as biographic information) pertaining to one or more users. Furthermore, user database 142 may include activity pattern information pertaining to the transactions of the one or more users. For example, user database 142 may include information detailing a user's spending habits on a certain day of the week or for certain types of meals (such as dinner). In another example, user database 142 may include information that a user plays poker every Friday night with user B, user C, and user D. Further, user database 142 may include mobile phone information pertaining to the one or more users such as a phone number, phone type, and operating system.

Computing device 110 includes monitoring program 112 and application 114. In the example embodiment, computing device 110 is a mobile device such as a smartphone, however in other embodiments, computing device 110 may be a desktop computer, a laptop computer, a tablet computer, a handheld device, a thin client, or any other electronic device or computing system capable of receiving and sending data to and from other computing devices, such as payment provider server 140, via network 130. Computing device 110 is described in more detail with reference to FIG. 6.

In the example embodiment, application 114 is a text messaging application through which the user is able to communicate with other users. In other embodiments, application 114 may be a social media application, a web browser, or another application that may be used to communicate with other people.

In the example embodiment, monitoring program 112 is a program capable of monitoring activity of a user of computing device 110, and further user activity on computing device 110, such as activity on application 114 or another application. In addition, monitoring program 112 is capable of accessing one or more components/modules of the monitored device, such as a microphone, a camera, or a global positioning system (GPS) module. In addition, monitoring program 112 is capable of updating user database 142 based on the collected monitored information. Furthermore, in the example embodiment, monitoring program 112 is capable of detecting payment related activity, such as by detecting speech by the user of computing device 110, or by analyzing communication activity between the user of computing device 110 and one or more other users. In addition, in the example embodiment, monitoring program 112 is capable of determining one or more users involved in the payment related activity, and further prompt the user of computing device 110 for an approval. Monitoring program 112 is additionally capable of identifying whether the payment is to the user, and based on the identifying, either transmit an invoice to the determined one or more users or process a payment from the user of computing device 110 to the one or more users. The operations of monitoring program 112 are described in further detail with reference to FIGS. 2 and 3.

Figure 2:
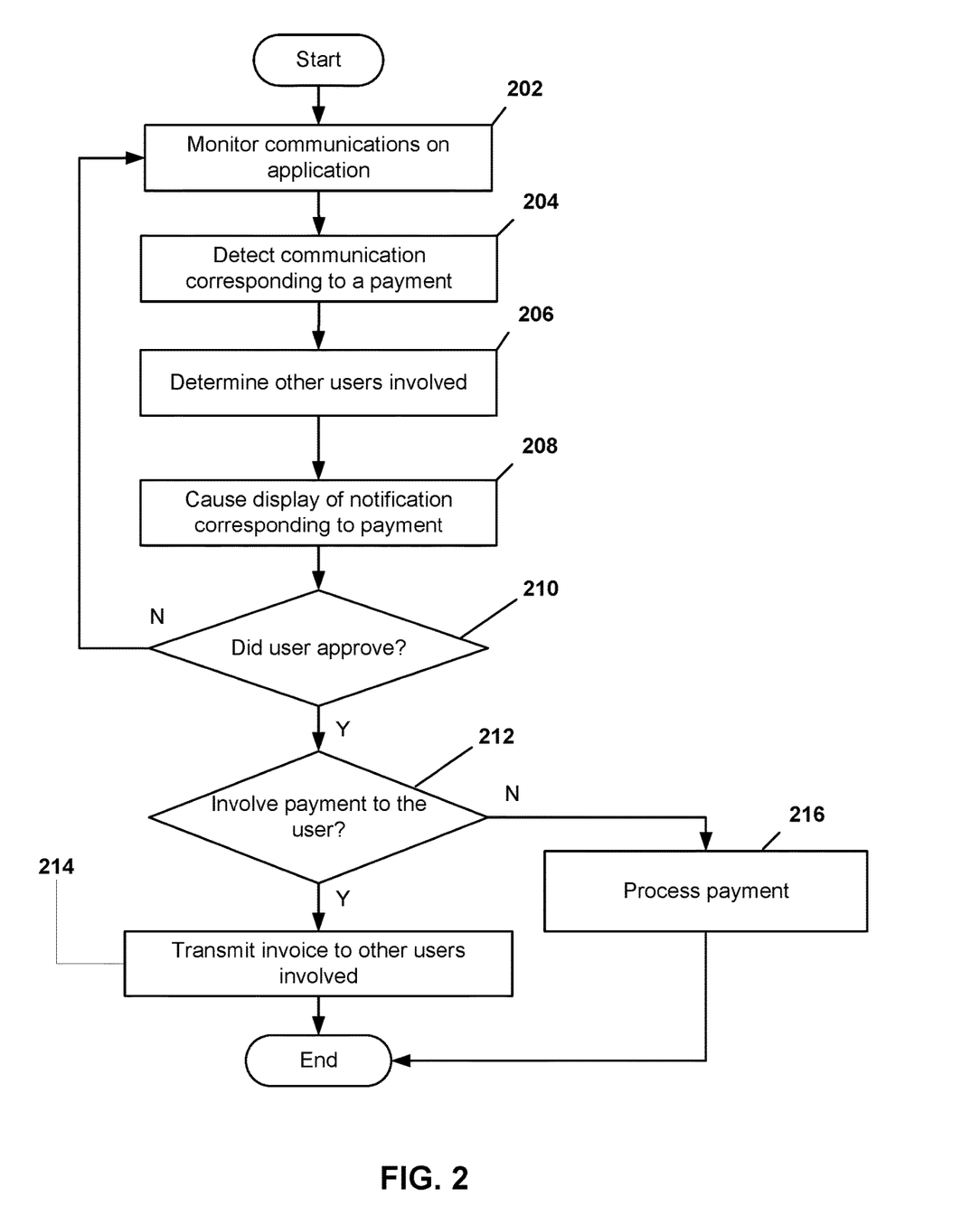
FIG. 2 is a flowchart illustrating the operations of the monitoring program of FIG. 1 in determining users involved in a payment, in accordance with an embodiment.

FIG. 2 is a flowchart illustrating the operations of monitoring program 112 in determining users involved in a payment, in accordance with an embodiment.

In the example embodiment, monitoring program 112 monitors communications on application 114 (step 202). In the example embodiment, monitoring program 112 is a separate program from application 114, however, in other embodiments, monitoring program 112 may be partially or fully integrated with application 114. In the example embodiment, monitoring program 112 monitors communications on application 114 in order to identify any communications related to a payment. Furthermore, in other embodiments, monitoring program 112 may monitor communications across multiple applications rather that monitoring a single application.

Monitoring program 112 detects a communication corresponding to a payment (step 204). In the example embodiment, the communication may be a single message, however, in other embodiments, the communication may be multiple communications. Furthermore, in the example embodiment, the communication may be expressed in a plurality of mediums, such as illustrative, textual, or auditory. For example, monitoring program 112 may detect a communication where the user of computing device 110 states "You owe me $5" to user A. Monitoring program 112 may further analyze the communication utilizing natural language processing techniques and determine that the communication involves a payment. Furthermore, monitoring program 112 may utilize natural language processing techniques to decipher the details of the payment from the communication. In another example, monitoring program 112 may detect a illustrative communication from user A, such as an emoticon and further analyze the emoticon to determine that the communication involves a payment. In the example embodiment, monitoring program 112 may utilize machine learning techniques to identify communication habits between the user of computing device 110 and other users, and further store the identified communication habits in a local database, or a server database, such as user database 142. In other words, monitoring program 112 may utilize machine learning techniques to identify communication habits and patterns that correspond to specific users. For example, in the example of the detected communication of an emoticon, monitoring program 112 may compare the emoticon to the database and identify based on the communication habits between the user of computing device 110 and user A stored in the database whether the emoticon corresponds to a payment.

Monitoring program 112 determines the other users involved in the payment (step 206). In the example embodiment, upon detecting the communication (or communications) corresponding to the payment, monitoring program 112 determines the other user (or users) involved in the payment. In the example embodiment, monitoring program 112 utilizes natural language processing techniques to analyze the communication in order to determine the other users involved in the payment. Additionally, monitoring program 112 may analyze the metadata associated with the communication in order to determine the other users involved in the payment. Furthermore, in other embodiments, where multiple communications related to the payment are detected, monitoring program 112 may utilize natural language processing techniques to identify relevant information from each communication to identify the other users involved in the payment.

Monitoring program 112 may additionally access a camera component of computing device 110 or another device to identify the other users involved in the payment. In other embodiments, monitoring program 112 may refer to user database 142 to identify spending habits corresponding to the user of computing device 110 and further identify users that the user of computing device 110 typically transacts with during a relevant time period. Furthermore, monitoring program 112 may utilize a GPS module or component on computing device 110 to identify a location of computing device 110, and further compare the location information to a location information of the user's friends. For example, monitoring program 112 may analyze a social media feed and identify that a first friend has checked into the location of computing device 110, or may triangulate the mobile device corresponding to friends of the user of computing device 110 (such as social media contacts of the user of computing device 110) and compare the location information to the location of computing device 110 to determine whether or not the friends are in the same location as the user of computing device 110. If the location information of a friend is the same or within a threshold distance of the user of computing device 110, monitoring program 112 may determine that the friend is involved in the payment. In this example, for the purposes of triangulation, monitoring program 112 may refer to a database, such as user database 142 to identify mobile device information for other users (such as social media contact or friends of the user of computing device 110). Additionally, monitoring program 112 may track user activity on computing device 110 in order to determine the other users involved in the payment. For example, monitoring program 112 may utilize location comparison and triangulation techniques to identify that a first friend and a second friend (and their respective devices) are within a threshold distance of the user of computing device 110. Monitoring program 112 may then analyze user activity on computing device 110 to determine that the user of computing device 110 is utilizing his/her device. If monitoring program 112 identifies that the first friend and second friend are also on their respective devices (by communicating with the devices via network 130), monitoring program 112 may determine that the first friend and second friend are involved in the payment. In other embodiments, monitoring program 112 may track whether the user and the friends logged into or launched a specific application, such as application 114 or monitoring program 112.

In additional embodiments, monitoring program 112 may communicate with computing device 110 and devices of the other users, via network 130, in order to determine a cellular or network reception level. In the example embodiment, monitoring program 112 may determine a specific cellular or network reception level associated with each device in order to determine whether they are in the same location. For example, if monitoring program 112 determines that the cellular reception associated with computing device 110 is 2.5554 and the cellular reception associated a device of a first friend is the same or within a certain threshold percentage of the reception level, monitoring program 112 may determine that the devices are in the same location, and based on the determination, determine that the first friend is involved in the payment (with the user of computing device 110).

In further embodiments, rather than monitoring application 114, or in addition to monitoring application 114, monitoring program 112 may access components of computing device 110, such as a microphone, in order to monitor and identify communication(s) related to a payment. For example, monitoring program 112 may monitor communications happening in the real world by accessing a microphone or auditory component of computing device 110. Further, monitoring program 112 may analyze the communications, which may include the utilization of natural language processing to identify whether or not the communications involve a payment. If monitoring program 112 determines that the communications (or at least one of the communications) involves a payment, monitoring program 112 may utilize natural language processing techniques or any of the techniques described above to identify the other users involved in the payment. In addition, monitoring program 112 may utilize a camera component on computing device 110 to identify the other users that the communication or communications are taking place with. For example, monitoring program 112 may identify the other users that the user of computing device 110 is communicating with, and based on tracking lip movements, identify the communications directly or match the communications being captured by the microphone with each user that is communicating. Monitoring program 112 may then analyze the captured speech as stated above, and identify the other users that are involved in the payment. The identification process may include monitoring program 112 comparing the captured image of a user (from the other users) to a database, such as user database 142, which contains records corresponding to a multitude of users (including personal information and images). In even further embodiments, monitoring program 112 may utilize a microphone of computing device 110 to capture a sound profile of a location of computing device 110. Monitoring program 112 may then compare the sound profile to the sound profiles of other users (that may also be captured in real time by monitoring program 112 utilizing a microphone component on a relevant device). If monitoring program 112 determines that the sound profile associated with computing device 110 matches the sound profile of another user, monitoring program 112 may determine that the another user is involved in the payment. In one example, monitoring program 112 may identify that the user of computing device 110 is in a location and further that a first user is within a threshold distance of the user of computing device 110. Monitoring program 112 may then capture a real time sound profile from both user devices and compare the profiles to determine whether the sound profiles either match or are within a threshold similarity of each other. If the sound profiles match or are within a threshold of similarity, monitoring program 112 may determine that the first user is involved in the payment (with the user of computing device 110). In addition, monitoring program 112 may utilize one or more of the proposed solutions above in combination in order to identify the other users involved in the payment.

In additional embodiments, rather than determining the other users involved with the payment by analyzing the communication or communications, monitoring program 112 may determine all parties or users involved in the payment, which may or may not include the user of computing device 110. For example, monitoring program 112 may monitor communications on computing device 110 and determine based on an analysis of the communication(s) that three other users (that do not include the user of computing device 110) are involved in the payment. Based on this determining, monitoring program 112 may transmit a notification to one or more of the three users.

Monitoring program 112 causes a notification corresponding to the payment to be displayed to the user of computing device 110 (step 208). In the example embodiment, monitoring program 112 causes a notification to be displayed on computing device 110 requesting for approval from the user of computing device 110 regarding a particular payment action. For example, as stated above, upon detecting a communication or communications corresponding to a payment, monitoring program 112 may decipher the payment details from the communication or communications. Therefore, in the example of a detected communication "You owe me $5" received by the user of computing device 110, monitoring program 112 may decipher the amount of payment ($5), determine that the payment is to be made from the user of computing device 110 to another user, and further determine the other user involved in the payment by utilizing one or more of the techniques described above. If monitoring program 112 determines that the other user involved in the payment is user A, monitoring program 112 may display a notification or cause a notification to be displayed on computing device 110 that includes a request for approval for a payment of $5 from the user of computing device 110 to user A. In another example, if monitoring program 112 determines that multiple other users are involved in the payment, such as user A and user B. Monitoring program 112 utilizes natural language processing techniques, similar analysis techniques, and/or the techniques described above to identify the amount of compensation that corresponds to each user. For example, if the communication states "User A, you owe me $10, and user B your tab is about $15". Monitoring program 112 may determine that user A corresponds with $10 and user B corresponds with $15. Therefore, when causing display of the notification to the user of computing device 110, monitoring program 112 may provide all the relevant information corresponding to each user and each corresponding amount. Furthermore, in order to identify the amount of compensation corresponding to each user, monitoring program 112 may reference user patterns and transactions that may be present in user database 142. For example, monitoring program 112 may identify that User A and User B are involved in the payment for dinner at restaurant A based on analyzing a communication or communications, as described above. Monitoring program 112 may then reference user transactions and activity corresponding to the particular restaurant and identify that User A typically orders a specific entree or typically spends a particular amount of money, and based upon the identifying predict the amount corresponding to User A.

If monitoring program 112 does not receive approval from the user of computing device 110 (decision 210 "NO" branch), monitoring program 112 continues to monitor communications on computing device 110, as described above (step 202). If monitoring program 112 receives approval from the user of computing device 110 (decision 210, "YES" branch), monitoring program 112 determines whether the payment is a payment to the user of computing device 110 from the other user (or users) involved in the payment (decision 212).

In the example embodiment, monitoring program 112 determines whether the payment is a payment to the user of computing device 110 or whether it is a payment from the user of computing device 110 to the other users involved in the payment by utilizing natural language processing techniques and other analysis techniques, such as those described above, to analyze the detected communication or communications corresponding to the payment. If monitoring program 112 determines that the payment is a payment to the user of computing device 110 from the other user(s) (decision 212, "YES" branch), monitoring program 112 transmits an invoice to the other user(s) involved in the payment (step 214). Upon receiving approval from the other user or users involved in the payment, monitoring program 112 may process the payment to the user of computing device 110. In another embodiment, rather than transmitting an invoice, upon determining that the payment is a payment to the user of computing device 110 from the other user or users, monitoring program 112 may utilize payment information or personal information present in user database 142 to directly process a payment from the other user or users involved in the payment to the user of computing device 110. If monitoring program 112 determines that the payment is not a payment to the user of computing device 110 (decision 212, "NO" branch), and is rather a payment from the user of computing device 110 to the other user or users involved in the payment, monitoring program 112 processes the payment from the user of computing device 110 to the other user or users involved in the payment.

In other embodiments, monitoring program 112 may not transmit a notification to computing device 110 requesting approval upon determination of the other user or users involved in the payment. Rather, monitoring program 112 may, upon determination of the other users or users, determine if the payment is to the user of computing device 110 or if the payment is from the user of computing device 110 to the other user or users involved in the payment as described above. As stated above, if monitoring program 112 determines that the payment is to the user of computing device 110 from the other user or users, monitoring program 112 may transmit an invoice to the other user or users, directly process the payment, or alternatively process the payment unless the user of computing device 110 intervenes within a threshold period of time. If monitoring program 112 determines that the payment is from the user of computing device 110 to the other user or users, monitoring program 112 processes the payment from the user of computing device 110 to the other user or users.

Figure 3:
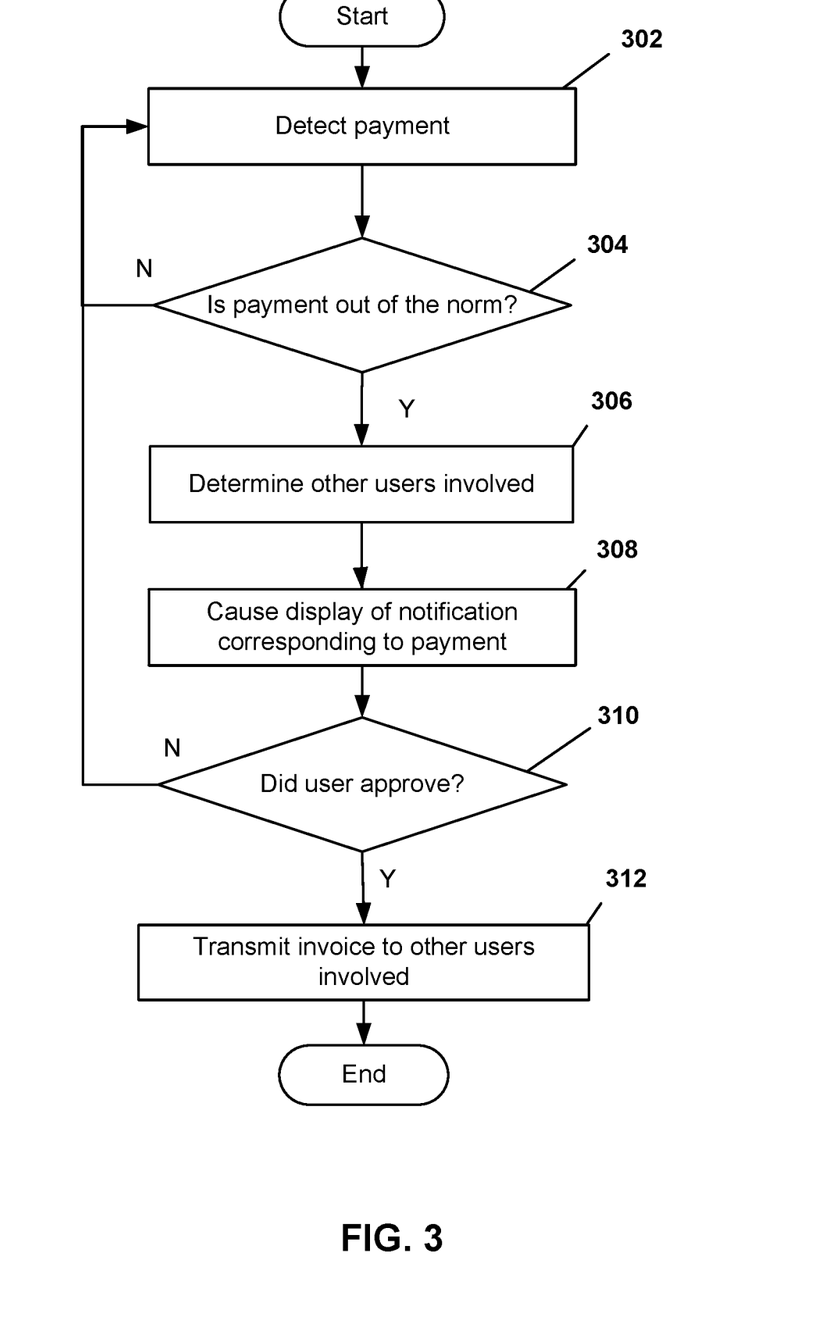
FIG. 3 is a flowchart illustrating the operations of the monitoring program of FIG. 1 in determining whether a payment is out of the normal and further determining users involved in a payment, in accordance with an embodiment.

FIG. 3 is a flowchart illustrating the operations of monitoring program 112 in determining whether a payment is out of the normal and further determining users involved in a payment, in accordance with an embodiment. In the example embodiment, monitoring program detects a payment that has been transacted by the user of computing device 110 (step 302). In the example embodiment, monitoring program 112 is a payment application, and therefore, detects a payment that is transacted through monitoring program 112. In other embodiments, monitoring program 112 monitors payment applications on computing device 110 in order to detect the payment. In other embodiments, monitoring program 112 detects a payment that is about to be completed or alternatively detects a payment request.

Monitoring program 112 determines whether the payment is out of the norm (decision 304). In the example embodiment, monitoring program 112 determines whether the payment is out of the norm based on referencing past user transactions and user activity stored in user database 142, and comparing the payment to the past user transactions and user activity (historical payment activity). For example, monitoring program 112 may analyze past user activity/transactions and determine that the user of computing device 110 typically spends $20 for dinner. Therefore, if the detected payment is $60, monitoring program 112 may determine that the payment is out of the norm for the user of computing device 110. In the example embodiment, monitoring program 112 may take several factors into account when determining whether the payment is out of the norm including the time of day, the time of year (whether it is a special occasion, or a holiday), the location of the user of computing device 110 (at home, on vacation, etc), the venue or location corresponding to the payment (expensive restaurant, corner noodle house, etc), and other relevant factors.

If monitoring program 112 determines that the payment is not out of the norm for the user of computing device 110 (decision 304, "NO" branch), monitoring program 112 continues to detect for payments (step 302). If monitoring program 112 determines that the payment is out of the norm for the user of computing device 110 (decision 304, "YES" branch), monitoring program 112 determines the other users involved in the payment in the same manner as described above (step 306). In the example embodiment, if monitoring program 112 analyzes the payment and determines that the payment is out of the norm, monitoring program 112 may predict that more than just the user of computing device 110 is involved in the payment. In other embodiments, if monitoring program 112 determines that the payment is out of the norm, monitoring program 112 may access location information, social media information and utilize the techniques described above in order to determine if the user of computing device 110 is with additional users. If monitoring program 112 determines that the user of computing device 110 is with other users, monitoring program 112 may then predict that more than just the user of computing device 110 is involved in the payment.

Monitoring program 112 causes a notification corresponding to the payment to be displayed to the user of computing device 110 in a similar manner as described above (step 308). In the example embodiment, as stated above with reference to FIG. 2, monitoring program 112 causes a notification to be displayed on computing device 110 requesting for approval from the user of computing device 110 regarding a particular payment action. For example, as stated above, upon detecting a communication or communications corresponding to a payment, monitoring program 112 may decipher the payment details from the communication or communications.

If monitoring program 112 does not receive approval from the user of computing device 110 (decision 310 "NO" branch), monitoring program 112 continues to detect for payments on computing device 110, as described above (step 302). If monitoring program 112 receives approval from the user of computing device 110 (decision 310, "YES" branch), monitoring program 112 transmits an invoice to the other user(s) involved in the payment (step 312). Upon receiving approval from the other user or users involved in the payment, monitoring program 112 may process the payment to the user of computing device 110. In another embodiment, rather than transmitting an invoice, upon determining that the payment is a payment to the user of computing device 110 from the other user or users, monitoring program 112 may utilize payment information or personal information present in user database 142 to directly process a payment from the other user or users involved in the payment to the user of computing device 110.

In other embodiments, monitoring program 112 may not transmit a notification to computing device 110 requesting approval upon determination of the other user or users involved in the payment. Rather, monitoring program 112 may, upon determination of the other users or users, may transmit an invoice to the other user or users, directly process the payment, or alternatively process the payment unless the user of computing device 110 intervenes within a threshold period of time.

Figure 4:
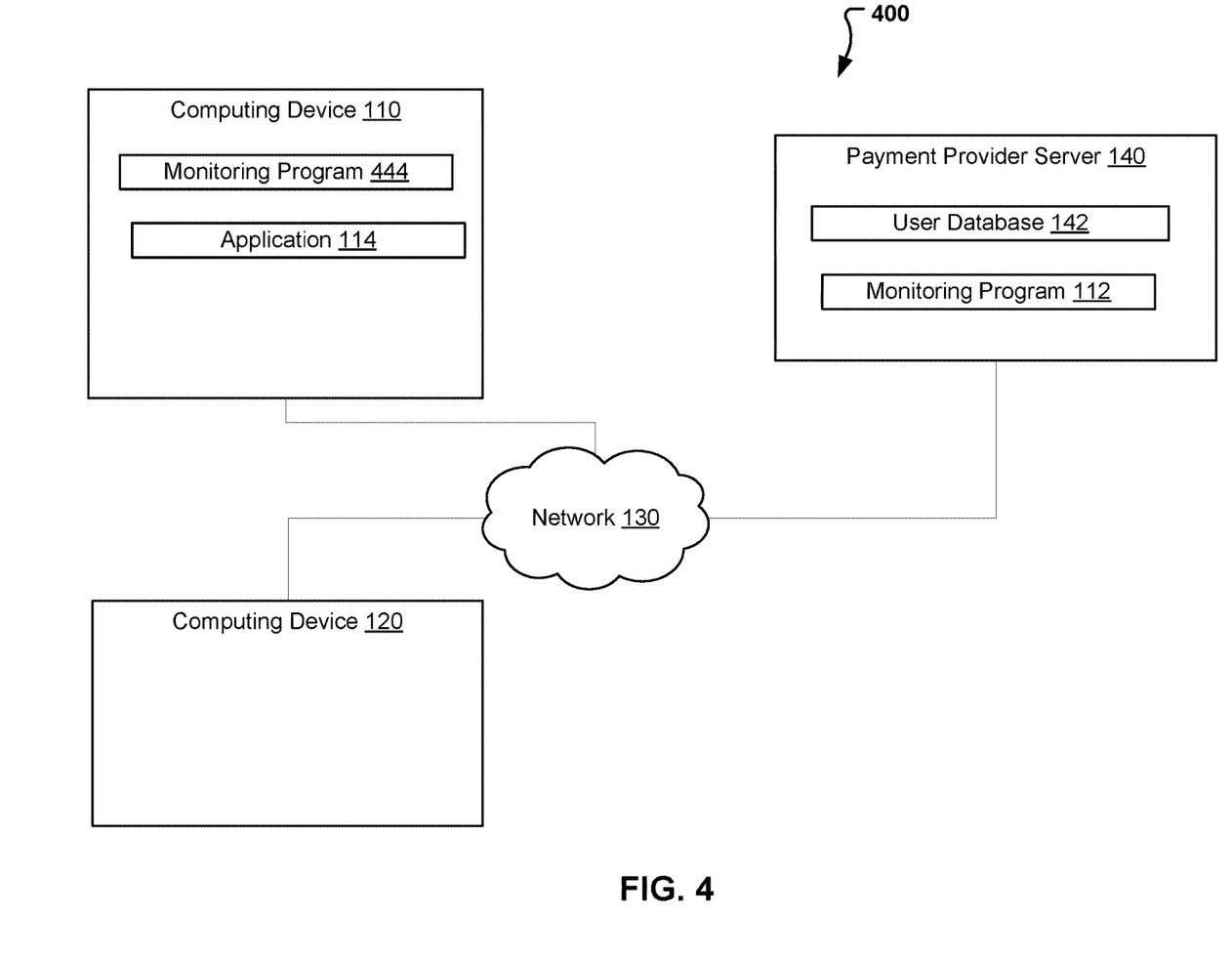
FIG. 4 illustrates an alternative embodiment of the monitoring system, in accordance with an embodiment.

FIG. 4 illustrates monitoring system 400, in accordance with an embodiment. In an example embodiment, monitoring system 400 includes computing device 110, computing device 120, and payment provider server 140 interconnected via network 130. In the example embodiment, monitoring system 400 includes monitoring program 112 on the payment provider server and a child or a sister program, monitoring program 444, on computing device 110. Therefore, monitoring program 112 may utilize monitoring program 444 to monitor activity on computing device 110, such as monitor communications on applications on computing device 110 and then monitoring program 112 may perform the steps recited in FIG. 2 and FIG. 3 based on the information gathered in the monitoring. Furthermore, in additional embodiments, additional child/sister programs may be located on devices of the other users, which monitoring program 112 may also communicate with. In further embodiments, monitoring program 112 may be located on payment provider server 140 and may monitor communications on computing device 110 (and other devices), including communications on application 114 via network 130, without the user of a child or a sister program, such as monitoring program 444.

Furthermore, while monitoring program 112 is depicted in the example embodiment as a single program, in other embodiments, monitoring program 112 may represent a plurality of programs working together to perform the functions corresponding to monitoring program 112 detailed above.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
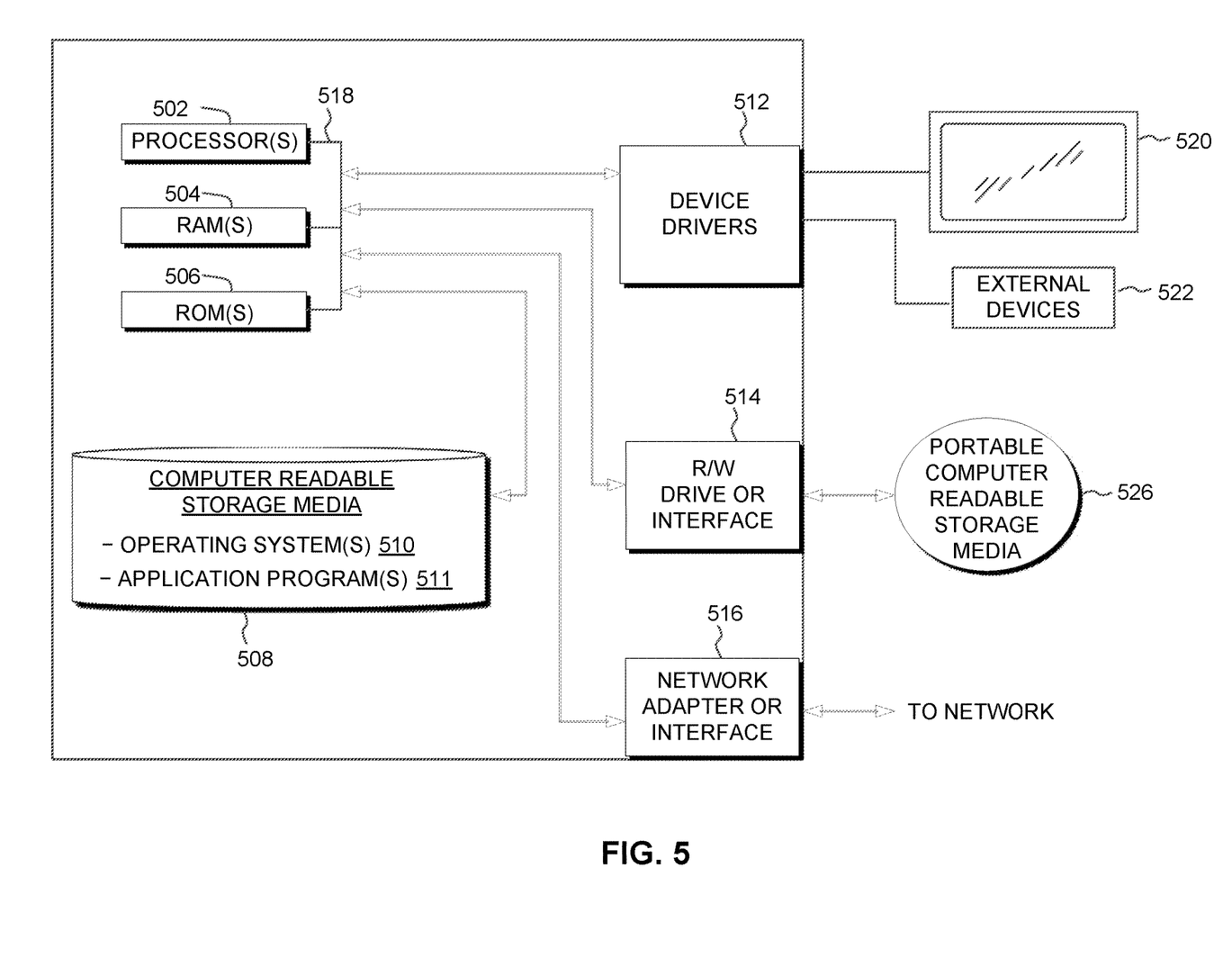
FIG. 5 is a block diagram depicting the hardware components of the monitoring system of FIG. 1, in accordance with an embodiment.

FIG. 5 depicts a block diagram of components of computing devices contained in monitoring system 100 of FIG. 1 and monitoring system 400 in FIG. 4, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, monitoring program 112, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
one or more computer-readable memories storing program instructions; and
one or more processors configured to execute the program instructions to cause the system to perform operations comprising:
monitoring one or more communication applications on a device of a user, wherein the one or more communication applications includes a video application;
identifying a communication that corresponds to a payment from a plurality of communications on the one or more communication applications, wherein the identifying the communication that corresponds to the payment includes analyzing a speech in a video captured by the video application, in real time;
in response to the identifying the communication that corresponds to the payment, automatically identifying one or more other users associated with the payment without prompting the user for information, wherein the automatically identifying the one or more other users comprises utilizing a sound receiving component of the device of the user to capture one or more sound profiles of a location of the device of the user and comparing the one or more captured sound profiles to one or more sound profiles corresponding to a device of the one or more other users; and
in response to automatically identifying one or more other users associated with the payment:
generating a user interface, wherein the user interface includes information corresponding to the one or more other users and a selectable user interface element that corresponds to an approval of the payment, and
providing the user interface to the user via the device of the user.

2. The system of claim 1, wherein the automatically identifying the one or more other users associated with the payment comprises analyzing location information to determine that the one or more other users are within a threshold distance of the user.

3. The system of claim 2, wherein the automatically identifying the one or more other users associated with the payment further comprises referencing a social media account of the user to determine that the one or more other users are associated with the social media account of the user.

4. The system of claim 1, wherein the automatically identifying the one or more other users associated with the payment comprises utilizing natural language processing techniques to analyze the communication corresponding to the payment.

5. The system of claim 1, wherein the operations further comprise:

in response to the identifying the one or more other users corresponding to the payment, automatically determining whether the user is a receiver of the payment.

6. The system of claim 1, wherein the operations further comprise:
in response to detecting a selection of the selectable user interface element, transmitting one or more invoices corresponding to the payment to the identified one or more other users.

7. The system of claim 1, wherein the monitoring one or more communication applications on the device of the user includes monitoring a plurality of communication applications on the device of the user.

8. A computer program product, comprising:
one or more computer-readable tangible storage devices, and program instructions stored on at least one of the one or more computer-readable tangible storage devices, the program instructions when executed cause a machine to perform operations comprising:
monitoring one or more applications on a device of a user, wherein the one or more applications includes a video application;
identifying an activity that corresponds to a payment from a plurality of activities associated with the one or more applications, wherein the identifying the activity that corresponds to the payment includes analyzing a speech in a video captured by the video application;
in response to the identifying the activity that corresponds to the payment, automatically identifying one or more other users associated with the payment without prompting the user for information, wherein the automatically identifying the one or more other users comprises utilizing a sound receiving component of the device of the user to capture one or more sound profiles of a location of the device of the user and comparing the one or more captured sound profiles to one or more sound profiles corresponding to a device of the one or more other users; and
in response to automatically identifying one or more other users associated with the payment:
generating a user interface, wherein the user interface includes information corresponding to the one or more other users and a selectable user interface element that corresponds to an approval of the payment, and providing the user interface to the user via the device of the user.

9. The computer program product of claim 8, wherein the automatically identifying the one or more other users associated with the payment comprises analyzing location information to determine that the one or more other users are within a threshold distance of the user.

10. The computer program product of claim 9, wherein the automatically identifying the one or more other users associated with the payment further comprises referencing a social media account of the user to determine that the one or more other users are associated with the social media account of the user.

11. The computer program product of claim 9, wherein the activity that corresponds to the payment includes a communication, and wherein the automatically identifying the one or more other users associated with the payment comprises utilizing natural language processing techniques to analyze the communication.

12. A method, comprising:
monitoring one or more communication applications on a device of a user;

identifying a communication that corresponds to a payment from a plurality of communications on the one or more communication applications; and in response to the identifying the communication that corresponds to the payment, automatically identifying one or more other users associated with the payment without prompting the user for information, wherein the automatically identifying the one or more other users associated with the payment further comprises utilizing a sound receiving component of the device of the user to capture one or more sound profiles of a location of the device of the user and comparing the one or more captured sound profiles to one or more sound profiles corresponding to a device of the one or more other users; and in response to automatically identifying one or more other users associated with the payment:

generating a user interface, wherein the user interface includes information corresponding to the one or more other users and a selectable user interface element that corresponds to an approval of the payment, and providing the user interface to the user via the device of the user.

13. The method of claim 12, wherein the automatically identifying the one or more other users associated with the payment comprises analyzing location information to determine that the one or more other users are within a threshold distance of the user.

14. The method of claim 13, wherein the automatically identifying the one or more other users associated with the payment further comprises referencing a social media account of the user to determine that the one or more other users are associated with the social media account of the user.

15. The method of claim 12, wherein the automatically identifying the one or more other users associated with the payment comprises utilizing natural language processing techniques to analyze the communication corresponding to the payment.

16. The method of claim 12, further comprising in response to the identifying the one or more other users corresponding to the payment, automatically determining whether the user is a receiver of the payment.

17. The method of claim 12, further comprising in response to detecting a selection of the selectable user interface element, transmitting one or more invoices corresponding to the payment to the identified one or more other users.

18. The method of claim 12, wherein the monitoring one or more communication applications on the device of the user includes monitoring a plurality of communication applications on the device of the user.

19. The method of claim 12, wherein the automatically identifying the one or more other users associated with the payment further comprises utilizing natural language processing techniques to analyze the communication.

* * * * *